(12) United States Patent
Ohara

(10) Patent No.: US 7,980,281 B2
(45) Date of Patent: Jul. 19, 2011

(54) PNEUMATIC TIRE WITH TREAD HAVING PROTRUDING STRIPE IN GROOVE BOTTOM AND TIRE MOLD FOR MAKING THE TIRE

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 894 days.

(21) Appl. No.: 11/855,240

(22) Filed: Sep. 14, 2007

(65) Prior Publication Data

US 2008/0078487 A1    Apr. 3, 2008

(30) Foreign Application Priority Data

Oct. 2, 2006 (JP) ................. 2006-270790
Oct. 2, 2006 (JP) ................. 2006-270838

(51) Int. Cl.
*B29C 33/42* (2006.01)
*B60C 11/04* (2006.01)
*B60C 11/12* (2006.01)
*B60C 11/13* (2006.01)

(52) U.S. Cl. ........ 152/209.19; 152/209.22; 152/DIG. 1; 152/DIG. 3; 152/901; 425/28.1

(58) Field of Classification Search ............ 152/209.19, 152/209.17, 209.18, 209.22, DIG. 1, DIG. 3, 152/901; 425/28.1, 35, 37, 46
See application file for complete search history.

(56) References Cited

U.S. PATENT DOCUMENTS

| 4,345,632 | A | * | 8/1982 | Takigawa et al. | ........ 152/209.19 |
| 5,115,850 | A | * | 5/1992 | Crump et al. | ............ 152/209.22 |
| 5,120,209 | A | * | 6/1992 | MacMillan | ..................... 425/46 |
| 5,800,642 | A | * | 9/1998 | Ohya | .......................... 425/28.1 |
| 6,112,788 | A |   | 9/2000 | Ikeda | |
| 6,196,288 | B1 | * | 3/2001 | Radulescu et al. | ........ 152/DIG. 3 |
| 2002/0092591 | A1 | * | 7/2002 | Cortes | ..................... 152/209.18 |
| 2006/0090829 | A1 |   | 5/2006 | Lopez | |
| 2007/0062626 | A1 |   | 3/2007 | Oyama | |

FOREIGN PATENT DOCUMENTS

| CA | 1313116 |   | 1/1993 |
| FR | 1163341 | * | 9/1958 |
| JP | 63-297108 | * | 12/1988 |
| JP | 64-52509 |   | 2/1989 |

(Continued)

OTHER PUBLICATIONS

Machine translation for France 1,163,341 (no date).*

(Continued)

*Primary Examiner* — Steven D Maki
(74) *Attorney, Agent, or Firm* — Fish & Richardson P.C.

(57) ABSTRACT

A groove bottom of a circumferential groove formed in a tread surface is provided with a protruding stripe extending along an extending direction of the circumferential groove. The protruding stripe is provided with a top head portion protruding toward a tire outer circumferential side, and a base portion which is narrower than the top head portion and connects the top head portion and the groove bottom. If a small stone is pinched, the top head portion is inclined around the base portion, and the protruding stripe is deflected as a whole, thereby generating a reaction force on the basis of a deformation restoring force.

8 Claims, 10 Drawing Sheets

FOREIGN PATENT DOCUMENTS

| | | | |
|---|---|---|---|
| JP | 02-088311 | * | 3/1990 |
| JP | 5286419 A | | 11/1993 |
| JP | 08-323771 | | 12/1996 |
| JP | 10-035224 | | 2/1998 |
| JP | 10-226206 | | 8/1998 |
| JP | 2000-185525 | | 7/2000 |
| JP | 2001-030715 | * | 2/2001 |
| JP | 2002-029218 | | 1/2002 |
| JP | 2002-211210 | * | 7/2002 |
| JP | 2002234313 A | | 8/2002 |
| JP | 2006-168571 | | 6/2006 |
| JP | 2007112421 A | | 5/2007 |

OTHER PUBLICATIONS

Machine translation for Japan 2002-211210 (no date).*
Machine translation for Japan 2001-030715 (no date).*
Chinese OA for Application No. 200710151984.3, dated Dec. 14, 2010, 7 pages.
Japanese Communication for Application No. 2006-270838 dated Nov. 30, 2010, 3 pages.
Chinese Office Action dated Jun. 2, 2010, 16 pages (with English translation).
Japanese Office Action for Application No. 2006-270838, dated Apr. 26, 2011, 3 pages.

* cited by examiner

FIG·2
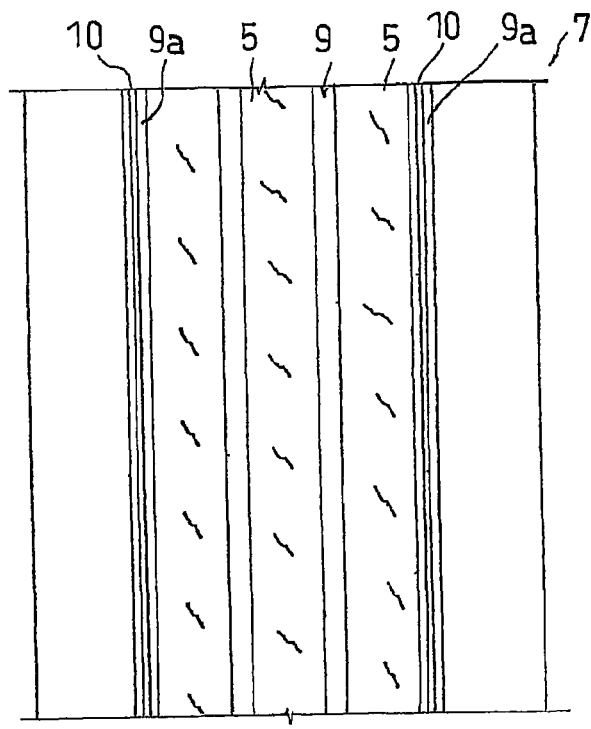
FIG·3
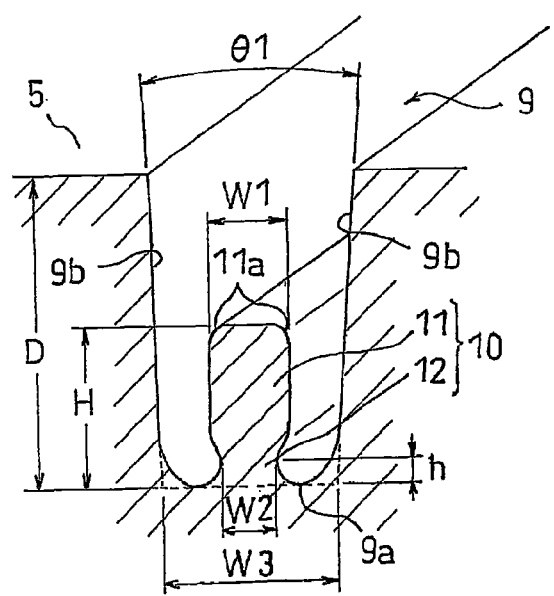

FIG·4
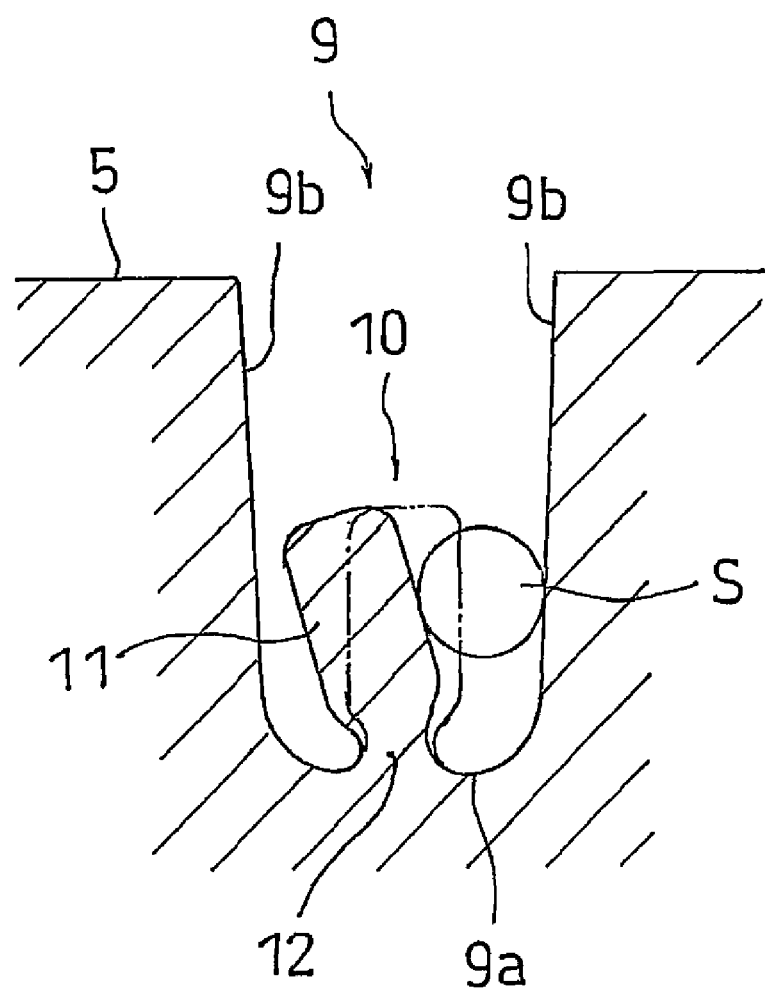

FIG·5
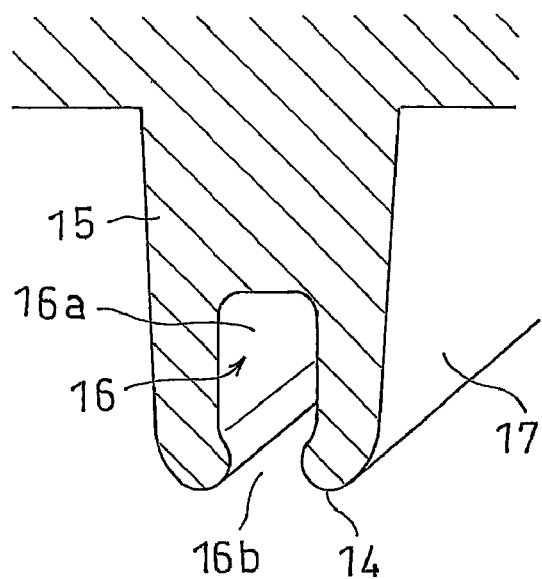
FIG·6
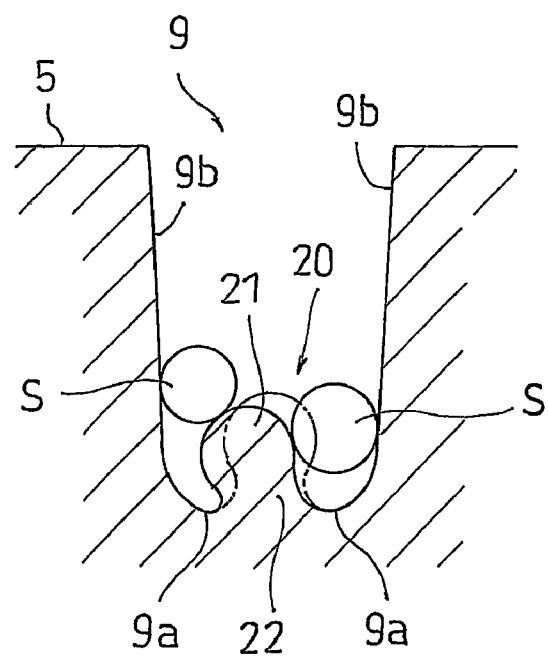

FIG·7
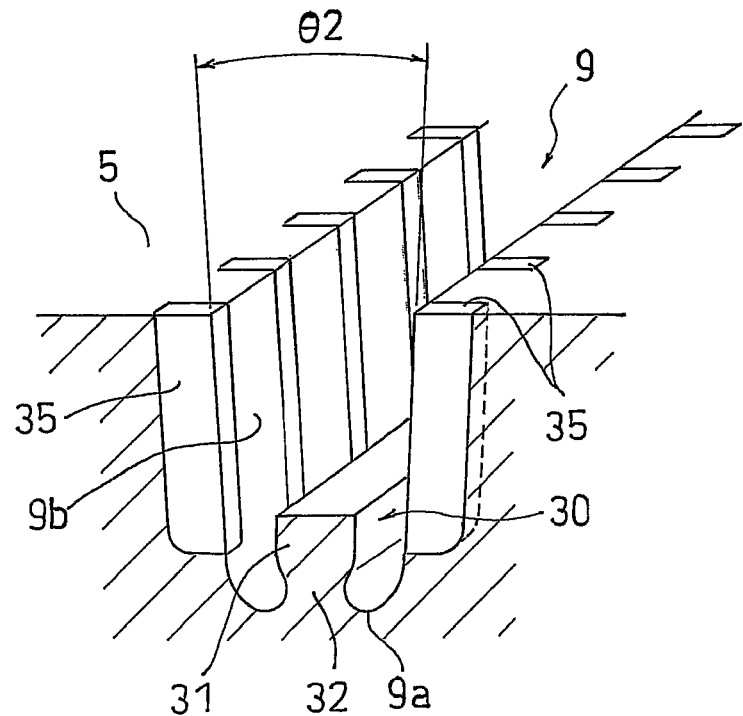
FIG·8
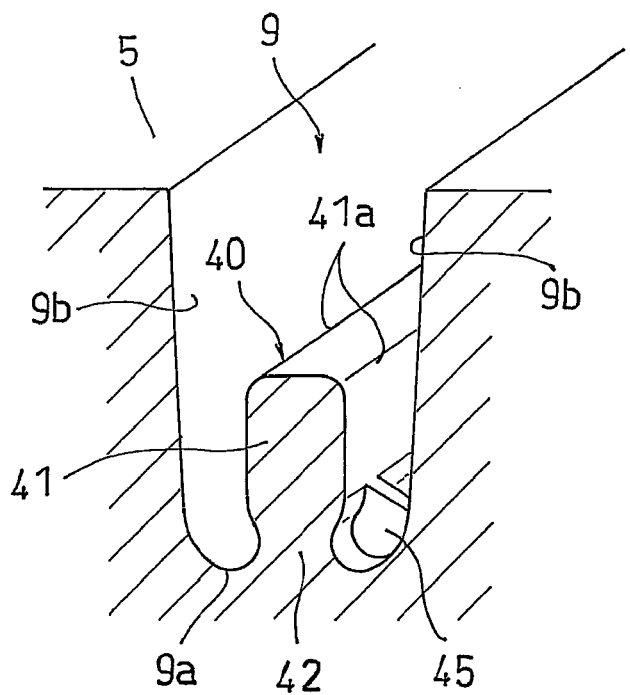

FIG·9
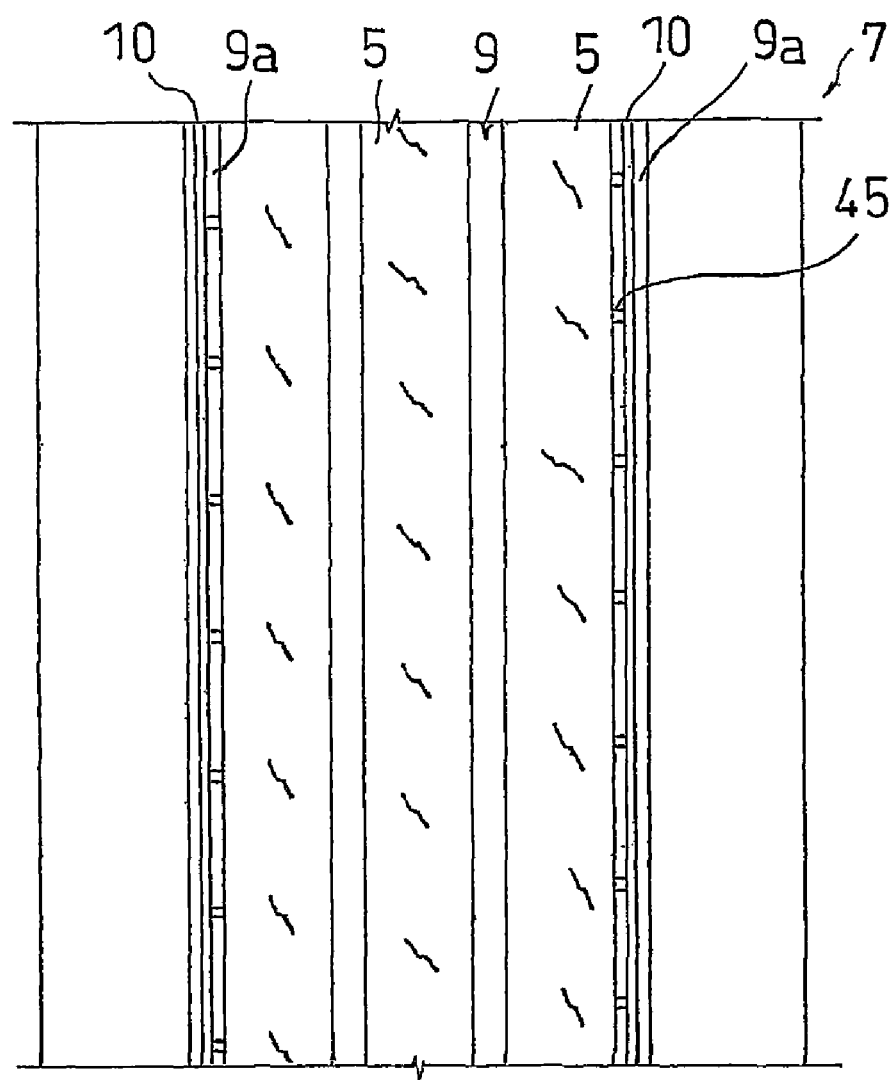

FIG·10
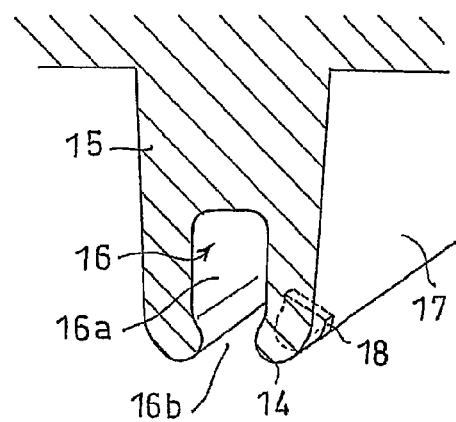
FIG·11
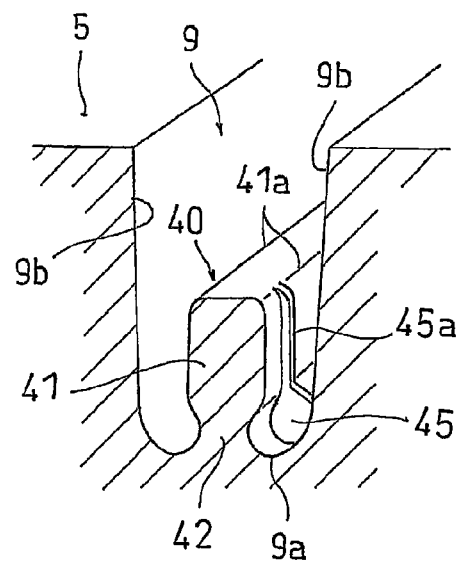

FIG·12
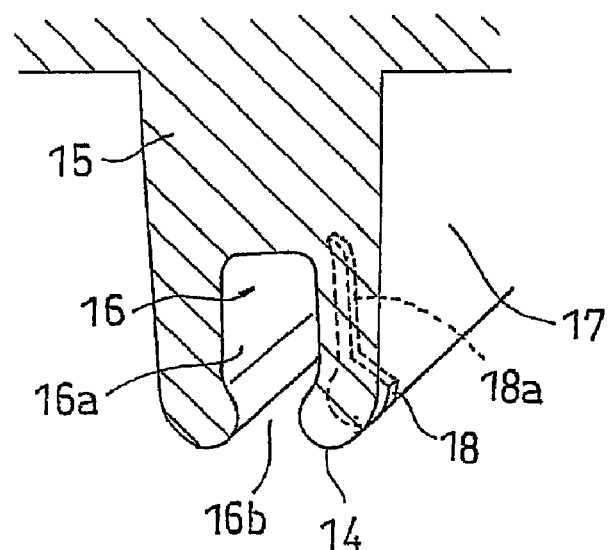
FIG·13
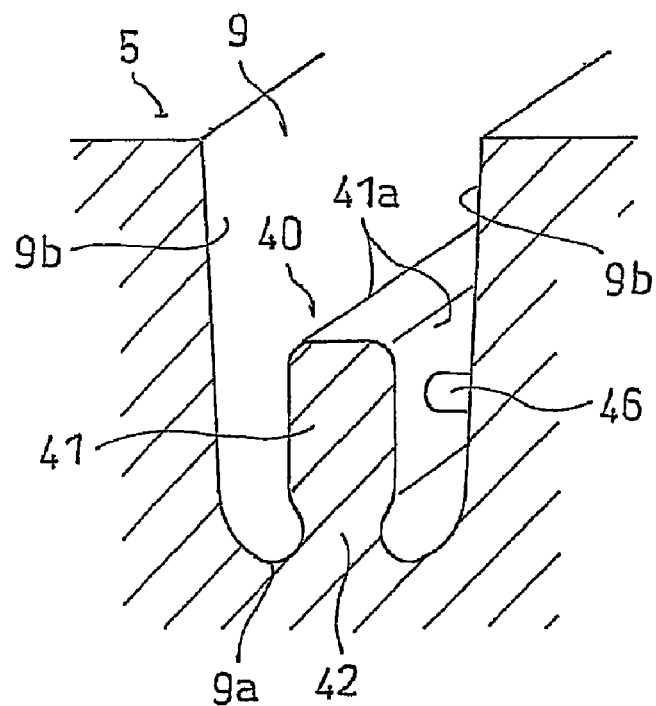

FIG·14
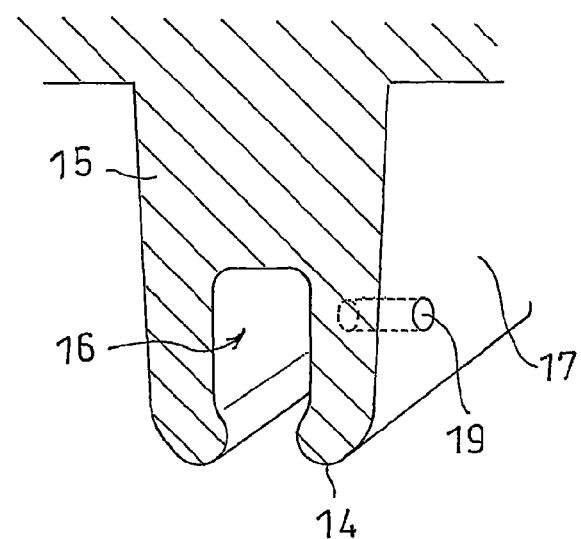
FIG·15
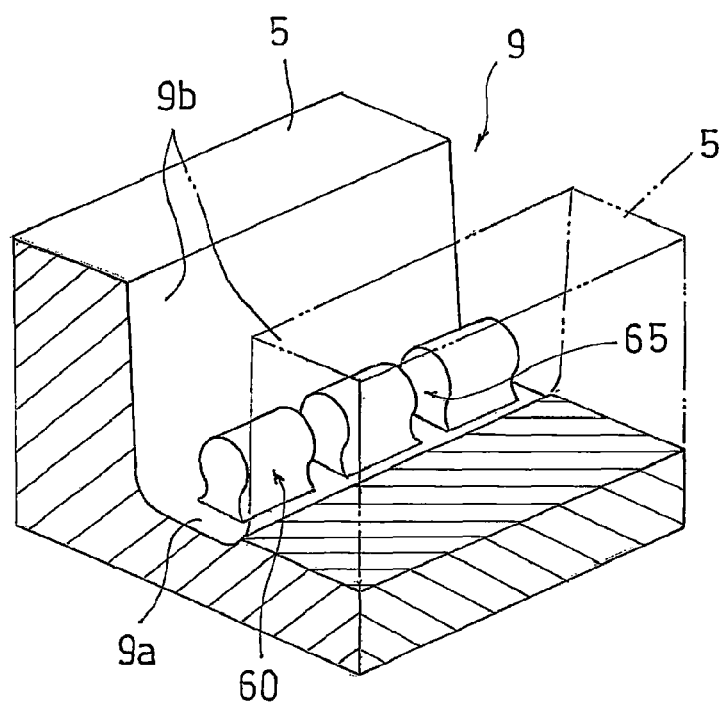

FIG·16
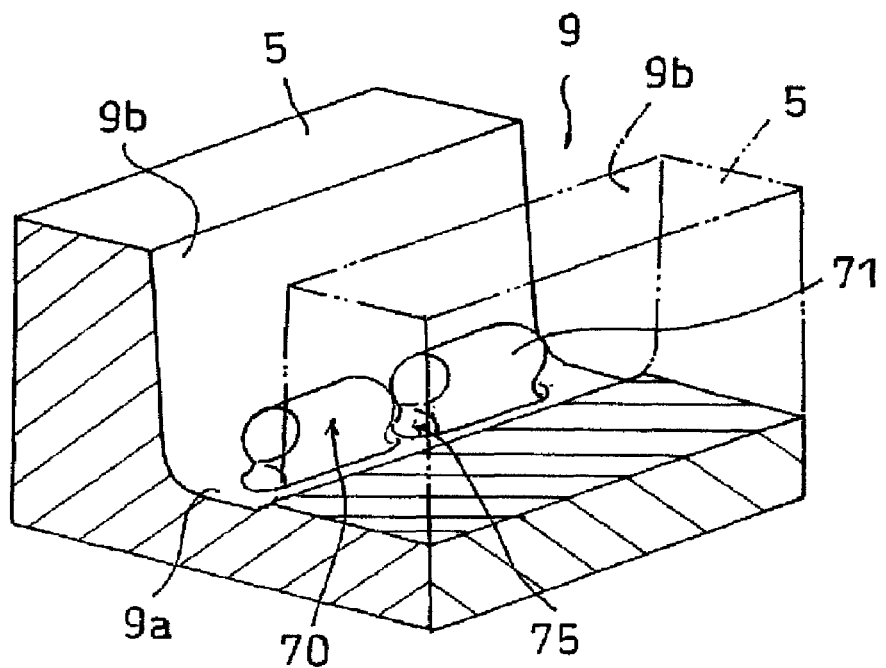
FIG·17
PRIOR ART
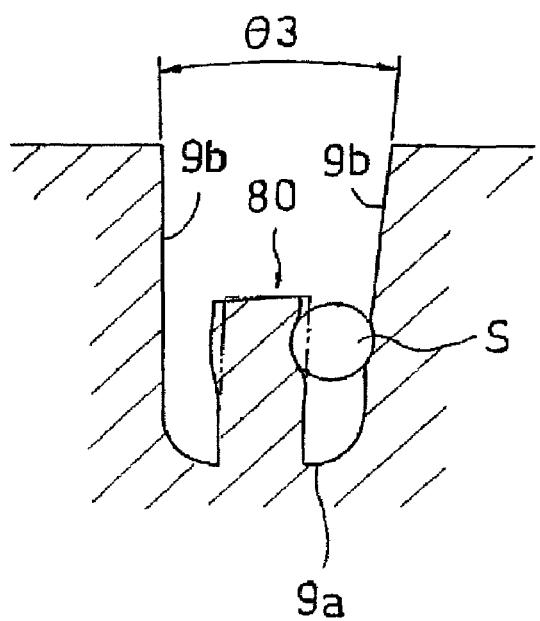

PNEUMATIC TIRE WITH TREAD HAVING PROTRUDING STRIPE IN GROOVE BOTTOM AND TIRE MOLD FOR MAKING THE TIRE

BACKGROUND OF THE INVENTION

1. Field of the Invention

The present invention relates to a pneumatic tire in which a protruding stripe is provided in a groove bottom of a groove portion of a tread surface, and a tire mold for molding the pneumatic tire.

2. Description of the Related Art

A tread surface of the pneumatic tire is generally provided with a groove portion such as a circumferential groove, a lateral groove or the like, and a land portion divided by the groove portion, and various tread patterns are formed in correspondence to a required tire performance and use condition. There is a case that a stone on the road is pinched in the groove portion at a time of traveling on a gravel road or the like which is not leveled. If the tire rolls under such the state, a force which tends to expand the groove portion is repeatedly applied, or the pinched stone makes an intrusion into the groove bottom, whereby there is a problem that a damage such as a groove bottom crack or the like is caused.

With regard to this problem, there has been proposed a structure in which a protruding stripe as shown in FIG. 17 is provided in a groove bottom of a groove portion, thereby preventing a stone biting, as described in Japanese Unexamined Patent Publication No. H10-35224, No. 2000-185525, and No. 2002-29218. However, if a small stone S is pinched between a protruding stripe 80 and a groove wall 9b as illustrated, there is a case that a side surface of the protruding stripe 80 is locally deformed so as to hold the small stone S in a wrapping manner. Therefore, it is not said that a stone biting resistance is sufficient.

Further, since a volumetric capacity in a side of a groove bottom 9a becomes smaller by setting the protruding stripe 80, a drainage performance is lowered in a state in which a wear has advanced, and a wet performance (a wet road traveling performance) may be deteriorated. On the other hand, if an angle θ3 of the groove wall is made small so as to secure a volumetric capacity in a side of the groove bottom 9a, there is generated a problem that the stone biting tends to be generated. Further, there is a concern of groove bottom crack starting from a root of the protruding stripe 80.

Conventionally, there is a tendency that a rigidity of the protruding stripe is increased for increasing a resistance against the stone intrusion, and Japanese Unexamined Patent Publication No. 2002-29218 describes a protruding stripe formed in a trapezoidal cross sectional shape obtained by gradually decreasing a width from a groove bottom toward an upper surface. However, in the case that the small stone is bitten between the protruding stripe and the groove wall as mentioned above, it is known that the small stone is strongly held due to its high rigidity, thereby making it hard to discharge out of the groove.

Further, Japanese Unexamined Patent Publication No. H10-226206 describes a pneumatic tire provided with a protruding stripe in a groove bottom of a groove portion, however, since such the protruding stripe is a small protruding stripe such a degree that a height thereof is equal to or less than 1 mm, and a plurality of protruding stripes can be provided in parallel in the groove bottom, the protruding stripe can not prevent the stone biting as mentioned above.

SUMMARY OF THE INVENTION

The present invention is made by taking the actual condition mentioned above into consideration, and an object of the present invention is to provide a pneumatic tire which can suppress damage such as a groove bottom crack or the like by effectively increasing a stone biting resistance, and a tire mold for molding the pneumatic tire.

The object can be achieved by the present invention having the following structure. The present invention provides a pneumatic tire in which a tread surface is provided with a groove portion, and a land portion divided by the groove portion, wherein a protruding stripe extending along an extending direction of the groove portion is provided in a groove bottom of the groove portion, and wherein the protruding stripe is provided with a top head portion protruding toward a tire outer circumferential side, and a base portion being narrower than the top head portion and connecting the top head portion and the groove bottom.

In accordance with the present invention, on the basis of the provision of the protruding stripe as mentioned above, the top head portion is easily inclined around the base portion at a time when the small stone is pinched between the protruding stripe and the groove wall, whereby the protruding stripe is deflected as a whole. Accordingly, such a reaction force as to push up the small stone by the side surface of the protruding stripe is effectively generated on the basis of a deformation restoring force of the protruding stripe, and the protruding stripe serves such as to discharge the small stone out of the groove. As a result, it is possible to increase the stone biting resistance so as to suppress the damage such as the groove bottom crack or the like.

In brief, the present invention positively deforms the protruding stripe, and utilizes the deformation restoring force generated thereby as the reaction force for discharging the small stone. On the contrary, the reaction force as mentioned above is hard to be generated in the protruding stripe 80 shown in FIG. 17, and the small stone S pinched between the protruding stripe 80 and the groove wall 9b can not be thrown out easily.

Further, in the present invention, the damage such as the groove bottom crack or the like is suppressed in the following points a to c.

a: Since the top head portion is easily inclined, a holding force of the small stone is smaller in comparison with the conventional structure, and the small stone is easily discharged on the basis of a centrifugal force at a time of rolling the tire. Accordingly, the stone biting resistance is improved.

b: Since the interval between the groove wall in the inclined side and the top head portion is narrowed in a state in which the top head portion is inclined by pinching the small stone, it is possible to inhibit the small stone from making an intrusion into the gap, and the stone biting resistance is improved.

c: Since the base portion of the protruding stripe is narrower than the top head portion, it is possible to easily form the boundary between the groove bottom and the base portion at an obtuse angle or in a circular arc shape having comparatively a large diameter, and it is possible to inhibit the crack from being generated starting from the root of the protruding stripe.

In addition, in accordance with the present invention, since the base portion is narrower than the top head portion, it is possible to secure the volumetric capacity in the groove bottom side large, and it is possible to achieve an excellent wet performance by maintaining the drainage performance even in a state in which a wear has advanced.

In the above structure, it is preferable that a ridge line portion in a tire outer circumferential side of the top head portion is formed by a curved surface having a circular arc cross sectional shape. In accordance with the present invention, since the base portion of the protruding stripe is narrower than the top head portion, there is a concern that the unvulcanized rubber is hard to be supplied to the leading end of the top head portion at a time of forming the tread pattern. However, since the ridge line portion in the tire outer circumference side of the top head portion is formed by the curved surface having the circular arc cross sectional shape, it is possible to easily and suitably form the shape of the top head portion. As a result, it is possible to sufficiently achieve the excellent stone biting performance as mentioned above. In this case, "circular arc cross sectional shape" means a circular arc shape in a tire meridian cross section.

In the above structure, it is preferable that the base portion is pinched-in while having a side surface formed in a circular arc cross sectional shape, and the side surface is smoothly connected to a side surface of the top head portion and the groove bottom. In accordance with the structure mentioned above, since the top head portion can be easily inclined around the pinched-in portion of the base portion, it is possible to easily and securely achieve the operation and effect of the present invention mentioned above. Further, a ductility of the deflecting deformation of the protruding stripe is increased, the reaction force for discharging the small stone can be more effectively obtained, the portion to which the strain tends to be concentrated falls away, and it is possible to suppress the groove bottom crack starting from the root of the protruding stripe.

In the above structure, it is preferable that the top head portion is formed in an approximately circular cross sectional shape. In accordance with the structure mentioned above, since the protruding stripe is formed by the curved surface which protrudes to the groove wall side from the leading end of the top head portion toward the side surface, the small stone is hard to be pinched between the top head portion and the groove wall. Further, even if the small stone is pinched, the reaction force is easily generated on the basis of the comparatively small contact area generated between the side surface of the top head portion and the small stone, and the stone biting resistance is effectively improved. In this case, "circular cross sectional shape" means a circular shape in a tire meridian cross section.

In the structure mentioned above, it is preferable that a ratio of a minimum width of the base portion with respect to a maximum width of the top head portion is between 0.5 and 0.9. Accordingly, it is possible to preferably achieve the operation and effect of the present invention mentioned above. In other words, if the ratio is less than 0.5, the base portion becomes too narrow. Therefore, there is a concern that the unvulcanized rubber is hard to be supplied to the top head portion at a time of forming the tread pattern, and the resistance at a time of releasing from the tire mold after finishing the vulcanization becomes enlarged, whereby the base portion tends to be broken. On the other hand, if the ratio mentioned above gets over 0.9, the protruding stripe tends to be hard to be smoothly deflected, and there is a tendency that an improving margin of the stone biting resistance is reduced.

A tread pattern of the tire is formed by a molding surface portion of a tire mold, and the groove portion is formed by pressing a groove portion forming frame provided in a protruding manner in the molding surface portion to a tread surface of a green tire. Accordingly, the protruding stripe mentioned above can be integrally provided by supplying the unvulcanized rubber to the protruding stripe forming portion from the groove bottom side of the tire (the groove bottom forming portion side of the tire mold), by providing the protruding stripe forming portion in a concave manner in the groove bottom forming portion of the groove portion forming frame. However, if the rubber filling to the protruding stripe forming portion is insufficient, a chip or the like is generated, and there is a case that it is impossible to sufficiently achieve the stone biting resistance.

Accordingly, in the present invention, it is preferable that a communication rubber portion formed by a communication hole communicating the protruding stripe forming portion and the groove wall forming portion in the groove portion forming frame provided in the tire mold is provided in at least one of the side surface of the protruding stripe and the groove wall of the groove portion. Accordingly, since the unvulcanized rubber is supplied to the protruding stripe forming portion not only from the groove bottom side but also via the communication hole at a time of forming the tread pattern, the formation of the shape of the top head portion is suitably executed, and it is possible to sufficiently achieve the excellent stone biting resistance as mentioned above.

In the above structure, it is preferable that the communication rubber portion has a stripe protruding portion which is formed by the communication hole and extends toward a leading end side of the protruding stripe in the side surface of the protruding stripe. In accordance with the structure mentioned above, the unvulcanized rubber supplied via the communication hole is smoothly filled in the leading end side of the protruding stripe forming portion, and the shape of the leading end side portion of the protruding stripe is more suitably formed, and it is possible to sufficiently achieve the stone biting resistance by the protruding stripe.

In the above structure, it is preferable that the protruding stripe is provided in a groove bottom of a circumferential groove continuously formed along the tire circumferential direction, and the land portion has a rib divided by the circumferential groove, and wherein an angle of a groove wall of the circumferential groove is equal to or less than 10 degree, and one-side open sipes extending to a tire inner circumferential side than the top head portion from a surface of the rib are provided in an edge portion of the rib so as to be spaced at 3 to 6 mm.

In accordance with the structure mentioned above, since the rigidity of the groove wall opposing to the top head portion is lowered, the holding force of the small stone pinched between the groove wall and the protruding stripe is lowered, and it is possible to easily discharge the small stone out of the groove on the basis of the reaction force generated in the protruding stripe and the centrifugal force at a time of rolling the tire. In addition, it is possible to suppress the local wear by lowering the rigidity of the edge portion of the rib, and it is possible to prevent a river wear from being generated so as to increase an irregular wear resistance.

Further, the present invention provides a tire mold in which a groove portion forming frame for forming a groove portion of a tread surface is provided in a protruding manner in a forming surface portion forming a tread pattern of a pneumatic tire, wherein the groove portion forming frame is provided with a groove bottom forming portion forming a groove bottom of the groove portion, a groove wall forming portion forming a grove wall of the groove portion, and a protruding stripe forming portion provided in a concave manner in the groove bottom forming portion and forming a protruding stripe extending along an extending direction of the groove portion in the groove bottom, and wherein the protruding stripe forming portion has a first forming portion forming a top head portion of the protruding stripe, and a second forming portion provided in a leading end side of the groove portion forming frame so as to be narrower than the first forming portion, and forming a base portion of the protruding stripe. Accordingly, the protruding stripe as mentioned above can be provided in the groove bottom of the groove portion of the tread surface, and it is possible to increase the stone biting resistance on the basis of the operation and effect mentioned above so as to suppress the damage such as the groove bottom crack or the like.

In the above structure, it is preferable that the groove portion forming frame is provided with a communication hole communicating the protruding stripe forming portion and the groove wall forming portion. Accordingly, at a time of forming the tread pattern, since the unvulcanized rubber is supplied to the protruding stripe forming portion from the groove bottom side of the tire, and is also supplied from the groove wall side via the communication hole, the unvulcanized rubber is smoothly filled in the protruding stripe forming portion, and the shape of the protruding stripe is properly formed.

In the above structure, it is preferable that the communication hole has a stripe groove portion facing to a side wall of the protruding stripe forming portion and extending toward a leading end side of the protruding stripe forming portion. In accordance with the structure mentioned above, the unvulcanized rubber supplied via the communication hole is smoothly filled in the leading end side of the protruding stripe forming portion, and the shape of the leading end side portion of the protruding stripe is more suitably formed.

BRIEF DESCRIPTION OF THE DRAWINGS

FIG. 2 is an expansion plan view of a tread surface of the pneumatic tire in FIG. 1;

FIG. 3 is an oblique perspective cross sectional view schematically showing a part of FIG. 1 in an enlarged manner;

FIG. 4 is a cross sectional view of a main portion showing a state in which a small stone is pinched in a groove portion of the pneumatic tire in FIG. 1;

FIG. 5 is an oblique perspective cross sectional view showing a groove portion forming frame provided in a tire mold for molding the pneumatic tire in FIG. 1;

FIG. 6 is a cross sectional view of a main portion showing a pneumatic tire in accordance with a second embodiment of the present invention;

FIG. 7 is a cross sectional view of a main portion showing a pneumatic tire in accordance with a third embodiment of the present invention;

FIG. 8 is a cross sectional view of a main portion showing a pneumatic tire in accordance with a fourth embodiment of the present invention;

FIG. 9 is an expansion plan view of a tread surface of the pneumatic tire in FIG. 8;

FIG. 10 is an oblique perspective cross sectional view showing a groove portion forming frame provided in a tire mold for molding the pneumatic tire in FIG. 8;

FIG. 11 is a cross sectional view of a main portion showing a pneumatic tire in accordance with a fifth embodiment of the present invention;

FIG. 12 is an oblique perspective cross sectional view showing a groove portion forming frame provided in a tire mold for molding the pneumatic tire in FIG. 11;

FIG. 13 is an oblique perspective cross sectional view showing a pneumatic tire in accordance with the other embodiment of the present invention;

FIG. 14 is an oblique perspective cross sectional view showing a groove portion forming frame provided in a tire mold for molding the pneumatic tire in FIG. 13;

FIG. 15 is an oblique perspective cross sectional view showing a pneumatic tire in accordance with the other embodiment of the present invention;

FIG. 16 is an oblique perspective cross sectional view showing a pneumatic tire in accordance with the other embodiment of the present invention;

FIG. 17 is a cross sectional view of a main portion showing an example of a conventional pneumatic tire.

DETAILED DESCRIPTION OF THE PREFERRED EMBODIMENTS

Figure 1:
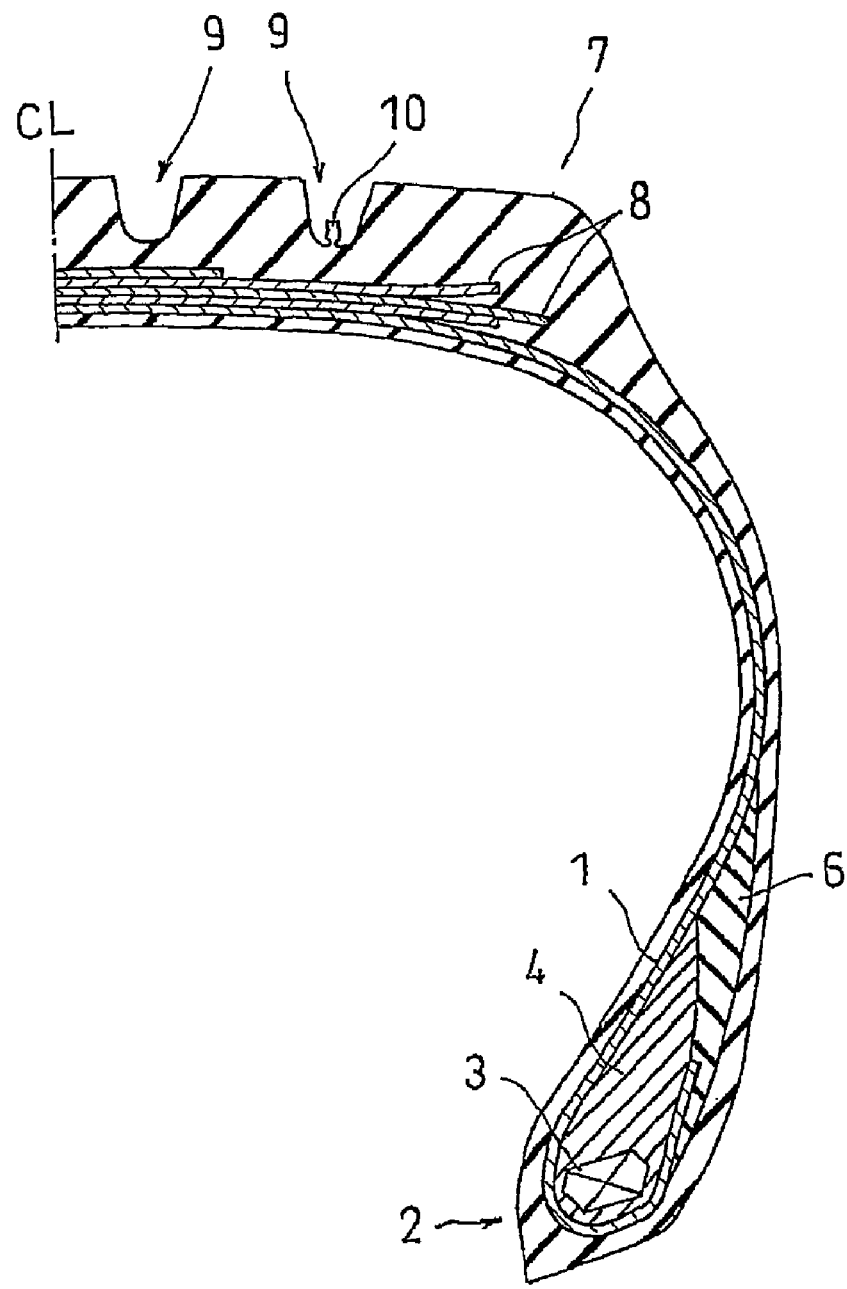
FIG. 1 is a tire meridian half cross sectional view showing a pneumatic tire in accordance with a first embodiment of the present invention.

Embodiments of the present invention will be explained with reference to the drawings.

First Embodiment

FIG. 1 is a tire meridian half cross sectional view showing one example of a pneumatic tire according to the present invention. FIG. 2 is an expansion plan view of a tread surface of the pneumatic tire. FIG. 3 is an oblique perspective cross sectional view schematically showing a part of FIG. 1 in an enlarged manner.

In the present embodiment, as shown in FIGS. 1 and 2, a circumferential groove 9 serving as a groove portion is provided in a tread surface serving as an outer circumferential side surface of a tread portion 7 continuously in a tire circumferential direction, and a land portion divided by the circumferential groove 9 is provided as a rib pattern having a rib 5 as a keynote. A protruding stripe 10 is provided in an extending manner in a groove bottom 9a of the circumferential groove 9 positioned in an outermost side in a tire width direction, in four circumferential grooves 9, along a tire circumferential direction corresponding to an extending direction of the circumferential groove 9.

The protruding stripe 10 is provided with a top head portion 11 constructing a center portion and an upper portion in a height direction, and a base portion 12 constructing a lower portion in the height direction, as shown in FIG. 3 in an enlarged manner. The top head portion 11 protrudes toward a tire outer circumferential side, and is formed in an approximately vertically longer rectangular cross sectional shape in the present embodiment. The base portion 12 is narrower than the top head portion 11, and is interposed between the top head portion 11 and the groove bottom 9a so as to integrally connect both the elements. A top surface of the top head portion is formed by a plane surface.

FIG. 4 is a cross sectional view of a main portion showing a state in which a small stone S is pinched between a groove wall 9b of the circumferential groove 9 and the protruding stripe 10. In the present invention, the top head portion 11 is easily inclined around the narrow base portion 12 at a time when the small stone S is pinched, and the protruding stripe 10 is deflected as a whole as shown in FIG. 4. Accordingly, such a reaction force as to push up the small stone S by the side surface of the protruding stripe 10 tends to be generated on the basis of a deformation restoring force of the protruding stripe 10, and the protruding stripe 10 serves such as to discharge the small stone S out of the groove. Further, since it is impossible to strongly hold the small stone S, the small stone S tends to be discharged out of the groove on the basis of a centrifugal force at a time of rolling the tire. Further, an interval between the left groove wall 9b and the top head portion 11 is narrowed in a state of pinching the small stone S, and it is possible to inhibit the small stone from making an intrusion into the gap.

In the present embodiment, a side wall of the base portion 12 is formed in a pinched-in shape by a curved surface having a circular arc cross sectional shape, and a radius of such the circular arc is preferably between 0.5 and 2.0 mm. When the small stone S is pinched, it is possible to easily and securely incline the top head portion 11 around the pinched-in portion of the base portion 12. Further, since the base portion 12 is narrower than the top head portion 11, it is possible to form the circular arc mentioned above comparatively large in diameter, and it is possible to effectively suppress a groove bottom crack starting from a root of the protruding stripe 10.

A side surface of the base portion 12 is smoothly connected to a side surface of the top head portion 11 and the groove bottom 9a. Accordingly, a ductility of a deflecting deformation of the protruding stripe 10 is increased, and the reaction force for discharging the small stone S is easily obtained, the portion to which the strain tends to be concentrated falls away, and it is possible to suppress the groove bottom crack starting from the root of the protruding stripe 10.

In the present invention, the side surface of the base portion 12 may be formed by a flat surface, however, in this case, it is preferable to form a boundary between the side surface of the base portion 12 and the groove bottom 9a by a curved surface having a circular arc cross sectional shape in the light of suppressing the groove bottom crack, and a radius of the circular arc mentioned above is preferably between 1.0 and 3.0 mm. In the present embodiment, a boundary between the groove bottom 9a and the groove wall 9b is formed by a curved surface having a circular arc cross sectional shape. A radius of such the circular arc is, for example, between 2.0 and 3.0 mm, however, it is desirable that a radius of curvature of the circular arc is larger than a radius of curvature of the side surface of the base portion 12, whereby it is possible to easily incline the top head portion 10 while suppressing the groove bottom crack in the rib 5 side.

As shown in FIG. 3, in the case of setting a groove depth of the circumferential groove 9 to D and a height of the protruding stripe 10 to H, it is preferable that a ratio H/D of a height H with respect to a groove depth D satisfies a relation 0.2<H/D<0.5, and it is more preferable that the ratio H/D satisfies a relation 0.3<H/D<0.4. If the ratio H/D is equal to or less than 0.2, there is a tendency that an improving margin of the stone biting resistance is reduced, and if the ratio H/D is equal to or more than 0.5, there is a risk that a drainage performance is lowered, and a wet performance is deteriorated.

Further, in the case of setting a maximum width of the top head portion 11 of the protruding stripe 10 to W1, and setting a minimum width of the base portion 12 to W2, it is preferable that a ratio W2/W1 of the minimum width W2 with respect to the maximum width W1 satisfies a relation $0.5 \leq W2/W1 \leq 0.9$, and it is more preferable that the ratio W2/W1 satisfies a relation $0.7 \leq W2/W1 \leq 0.8$, in the light of preferably achieving the operation and effect of the present invention. In this case, it is preferable that a height h of a minimum width position of the base portion 12 is equal to or less than one half of the height H of the protruding stripe 10, in the light of suitably deflecting the protruding stripe 10. Specifically, the height h is preferably between 0.7 and 2.0 mm, and more preferably between 1.0 and 1.5 mm.

Further, in the case of setting the groove bottom width of the circumferential groove 9 to W3, it is preferable that a ratio W1/W3 of the maximum width W1 with respect to the groove bottom width W3 satisfies a relation $0.2 \leq W1/W3 \leq 0.6$, and it is more preferable that the ratio W1/W3 satisfies $0.3 \leq W1/W3 \leq 0.5$. If the ratio W1/W3 is less than 0.2, the reaction force generated in the protruding stripe 10 tends to be smaller, and if the ratio W1/W3 gets over 0.6, the protruding stripe 10 tends to be hard to be deflected.

In the present invention, since the base portion 12 is narrower than the top head portion 11, it is possible to secure a volumetric capacity of the groove bottom 9a side of the circumferential groove 9 large, and it is possible to maintain the drainage performance even in a state in which the wear has advanced, thereby achieving an excellent wet performance.

The pneumatic tire in accordance with the present invention is the same as the conventional pneumatic tire except that the protruding stripe as mentioned above is provided in the groove portion of the tread surface, and the known material, shape, structure, manufacturing method and the like can be applied to the present invention. In this case, since the excellent stone biting performance can be achieved, the pneumatic tire is very useful for a pneumatic tire for a heavy load installed to a truck or a construction vehicle which has a lot of chances of moving on a gravel road or a land grading field in which the small stones are scattered.

In the present embodiment, there is shown an example of the pneumatic tire for the heavy load. In this tire, as shown in FIG. 1, a carcass ply 1 is wound up from an inner side to an outer side around a bead core 3 and a rubber filler 4 arranged in a bead portion 2 so as to be locked, and a wind-up end is arranged in a middle portion of a diagonal line of the rubber filer 4. A pad 6 is provided in such a manner as to pinch the wind-up end of the carcass ply 1 together with the rubber filler 4.

The carcass ply 1 is constituted by one layer or plural layers of plies obtained by arranging a steel cord, a high strength organic fiber cord or the like in a tire radial direction. Further, the bead core 3 is constituted by a layered product of a bead wire and a coated rubber, and the rubber filler 4 is constituted by a hard rubber having an approximately triangular cross sectional shape in which a bottom line is formed in a circular arc shape.

A belt layer 8 is arranged in a tire outer circumferential side of the carcass ply 1 of the tread portion 7, and a belt reinforcement layer is arranged in an outer circumference thereof as occasion demands. A rubber hardness of the tread rubber may be set to a generally used one, and the tread pattern as mentioned above is formed in the tread surface. An inner liner rubber for maintaining a pneumatic pressure is provided in an inner circumferential side of the carcass ply 1, and a side wall rubber is provided in an outer circumferential side of the carcass ply 1 between the tread portion 7 and the bead portion 2.

In the tread pattern exemplified in FIG. 2, a closed sipe aiming at an improvement of the wet performance or the like is provided in a center rib 5 near a tire equator line CL, and ribs 5 in both sides thereof. A shape of the rib 5 is not particularly limited, but may be divided, for example, by a circumferential groove extending in a zigzag shape. In this case mentioned above, a protruding stripe extending in the zigzag shape or a wavy shape is provided along the extending direction of the circumferential groove.

In this case, in the pneumatic tire for the heavy load, there is exemplified a pneumatic tire in which a groove bottom width W3 of the circumferential groove 9 is between 7 and 16 mm or between 10 and 12 mm, a groove depth D of the circumferential groove 9 is between 10 and 20 mm or between 14 and 16 mm, and a groove wall angle θ1 of the circumferential groove 9 is between 0 and 20 degree. At this time, as an example of a dimension of the protruding stripe 10, there is exemplified a protruding stripe in which a height H is between 5 and 7 mm, a maximum width W1 of the top head portion 11 is between 3 and 5 mm, and a minimum width W2 of the base portion 12 is between 2.5 and 3.0 mm.

The pneumatic tire in accordance with the present invention can be manufactured in the same manner as the conventional tire manufacturing step except for such a modification that a protruding stripe forming portion for forming the protruding stripe 10 is provided in the groove portion forming frame provided in the tire mold.

FIG. 5 is an oblique perspective cross sectional view showing the groove portion forming frame provided in the tire mold for molding the pneumatic tire mentioned above. A groove portion forming frame 15 is provided with a groove bottom forming portion 14 forming the groove bottom 9a of the circumferential groove 9, a groove wall forming portion 17 forming the groove wall 9b of the circumferential groove 9, and a protruding stripe forming portion 16 provided in a concave manner in the groove bottom forming portion 14 for forming the protruding stripe 10 in the groove bottom 9a. The circumferential groove 9 is provided in a concave manner by pressing the groove portion forming frame 15 to the tread surface of the green tire.

The protruding stripe forming portion 16 is provided in a concave manner from the groove bottom forming portion 14 toward a root side of the groove portion forming frame 15, and has a shape corresponding to the protruding stripe 10. The protruding stripe forming portion 16 has a first forming portion 16a forming the top head portion 11 of the protruding stripe 10, and a second forming portion 16b provided narrower than the first forming portion 16a in a leading end side of the groove portion forming frame 15 and forming the base portion 12 of the protruding stripe 10. When the groove portion forming frame 15 is pressed to the tread surface of the green tire, the unvulcanized rubber is supplied to the protruding stripe forming portion 16 from the groove bottom side, and the protruding stripe 10 provided with the top head portion 11 and the base portion 12 is formed in a convex manner.

In the present invention, since the base portion 12 of the protruding stripe 10 is narrower than the top head portion 11, there is a concern that the unvulcanized rubber is filled in the leading end of the protruding stripe forming portion 16. However, in the present embodiment, since the ridge line portion 11a in the tire outer circumferential side of the top head portion 11 is formed by the curved surface having the circular arc cross sectional shape as shown in FIG. 3, the unvulcanized rubber tends to be filled in the protruding stripe forming portion 16, and it is possible to suitably form the shape of the top head portion 11.

Second Embodiment

Since a second embodiment has the same structure as that of the first embodiment except the following structures of the groove portion and protruding stripe, a description will be given mainly of different points by omitting the common points. In this case, the same reference numerals are attached to the same members as the already described members in the description of the first embodiment, and an overlapping description will be omitted.

A protruding stripe 20 is provided with a top head portion 21 constructing an upper half thereof, and a base portion 22 constructing a lower half thereof, as shown in FIG. 6. The top head portion 21 protrudes toward a tire outer circumferential side while forming an approximately circular cross sectional shape, and is formed by a curved surface which is convex to the groove wall 9b side from a leading end thereof toward a side surface. The base portion 22 has approximately the same shape as the base portion 12 in the first embodiment, and is structured by integrally connecting the top head portion 21 and the groove bottom 9a.

In the present embodiment, since the protruding stripe 20 has the shape as mentioned above, the small stone S is hard to be pinched between the top head portion 21 and the groove wall 9b. Further, even if the small stone S is pinched, a reaction force is easily generated because a contact area between the side surface of the top head portion 21 and the small stone S is comparatively small, whereby the stone biting resistance is effectively improved.

In the tire meridian cross section, a circular arc constructing an outline of the top head portion 21 is smoothly connected to a circular arc constructing a side surface of the base portion 22, and the circular arc constructing the side surface of the base portion 22 is smoothly connected to the groove bottom 9a. Accordingly, a ductility of the deflecting deformation of the protruding stripe 20 is effectively increased, the position to which the strain tends to be concentrated falls away, and it is possible to suppress the groove bottom crack starting from the root of the protruding stripe 20.

Third Embodiment

Since a third embodiment has the same structure as that of the first embodiment except the following structures of the groove portion and protruding stripe, a description will be given mainly of different points by omitting the common points. In this case, the same reference numerals are attached to the same members as the already described members in the description of the first embodiment, and an overlapping description will be omitted.

A protruding stripe 30 is provided with a top head portion 31 constructing an upper half thereof, and a base portion 32 constructing a lower half thereof, as shown in FIG. 7. A top head portion 31 protrudes toward a tire outer circumferential side while forming an approximately rectangular cross sectional shape, and a protruding height is smaller in comparison with the top head portion 11 in the first embodiment. A base portion 32 has approximately the same shape as the base portion 12 of the first embodiment, and integrally connects the top head portion 31 and the groove bottom 9a.

In the present embodiment, an angle θ2 of the groove wall of the circumferential groove 9 is set to be equal to or less than 10 degree, and one side open sipe 35 opening at the groove wall 9b is provided in an edge portion of the rib 5. The sipe 35 extends in a groove depth direction from a surface of the rib 5 so as to be terminated at a position corresponding to a tire inner circumferential side than an upper surface of the top head portion 31, and is provided so as to be spaced at a predetermined interval along the extending direction of the circumferential groove 9.

Accordingly, a rigidity of the groove wall 9b is lowered, and a holding force of the small stone S pinched between the groove wall 9b and the protruding stripe 30 is reduced. Therefore, it is possible to easily discharge the small stone S out of the groove on the basis of the centrifugal force at a time of rolling the tire in addition to the reaction force generated in the protruding stripe 30. Further, although the circumferential groove 9 easily pinches the small stone by setting the angle θ2 of the groove wall to be equal to or less than 10 degree, since the excellent stone biting resistance can be achieved as mentioned above in the present invention, the volumetric capacity in the groove bottom 9a side is increased while suppressing the stone biting, whereby it is possible to increase the wet performance at a time when the wear has advanced. In addition, since it is possible to suppress the local wear by lowering the rigidity of the edge portion of the rib 5, it is possible to prevent the river wear from being generated so as to increase the irregular wear resistance.

The interval at which the sipes 35 are spaced is between 3 and 6 mm, and if the interval is less than 3 mm, a thickness of a rubber piece between the sipes 35 is thin and the rubber piece tends to be deformed. Accordingly, there is a tendency that a crack is generated or shredded. On the other hand, if the interval gets over 6 mm, an effect of lowering the rigidity of the groove wall 9*b* is small, and the improving margin of the stone biting resistance becomes small. In this case, in the light of the rigidity reduction of the groove wall 9*b* and the durability of the rib 5, a groove width of the sipe 35 is preferably between 0.5 and 1.0 mm, and a length on a tread surface of the sipe 35 is preferably between 3 and 5 mm.

Fourth Embodiment

Since a fourth embodiment has the same structure as that of the first embodiment except the following structures of the groove portion and protruding stripe, a description will be given mainly of different points by omitting the common points. In this case, the same reference numerals are attached to the same members as the already described members in the description of the first embodiment, and an overlapping description will be omitted.

A protruding stripe 40 is provided with a top head portion 41 and a base portion 42 as shown in FIG. 8, and a cross sectional shape thereof is approximately the same as the protruding stripe 10 of the first embodiment. In the present embodiment, a side surface of the protruding stripe 40 and the groove wall 9*b* are provided with a tabular communication rubber portion 45 extending so as to connect both the elements. The communication rubber portion 45 is integrally connected to a lower side portion of the top head portion 41, a side surface of the base portion 42, the groove wall 9*b* and the groove bottom 9*a*. As shown in FIG. 9, the communication rubber portions 45 are provided along the extending direction of the circumferential groove 9 so as to be spaced, preferably at 10 to 50 mm, and more preferably at 30 to 40 mm.

The protruding stripe 40 is formed by the groove portion forming frame 15 as shown in FIG. 10. The groove portion forming frame 15 is provided with a communication hole 18 communicating the protruding stripe forming portion 16 and the groove wall forming portion 17 so as to be formed as a slit shape in a leading end side of the groove portion forming frame 15. At a time when the groove portion forming frame 15 is pressed to the tread surface of the green tire, the supply of the unvulcanized rubber to the protruding stripe forming portion 16 is executed not only from the groove bottom 9*a* side but also via the communication hole 18. Accordingly, the unvulcanized rubber is smoothly supplied to the protruding stripe forming portion 16 so as to make it easy to fill the rubber, and the shape of the protruding stripe 40 is suitably formed.

Since an inlet of the protruding stripe forming portion 16 provided in the groove portion forming frame 15 becomes narrow, in the protruding stripe 40 provided with the top head portion 41 and the base portion 42, the unvulcanized rubber is hard to be smoothly supplied, and there is a special concern about forming the shape of the top head portion 41. However, in accordance with the structure mentioned above, it becomes easy to fill the rubber in the protruding stripe forming portion 16 as mentioned above, and the shape of the top head portion 41 is suitably formed.

In the present embodiment, an upper surface of the communication rubber portion 45 is inclined to a tire outer circumferential side from the groove wall 9*b* toward the protruding stripe 40. Accordingly, it is possible to smoothly execute the supply of the unvulcanized rubber to the protruding stripe forming portion 16, particularly, the supply to the first forming portion 16*a* forming the top head portion 41, and the rubber filling is more easily executed. Further since the inclination of the top head portion 41 is not obstructed, it is possible to sufficiently achieve the stone biting resistance by the protruding stripe 40.

Such the structure is useful in the case that the shape of the top head portion 41 is vertically longer as the illustrated example, and it becomes better to form the shape by forming the ridge line portion 41*a* in the tire outer circumferential side of the top head portion 41 by the curved surface having the circular arc cross sectional shape in addition thereto. In this case, the communication rubber portion 45 may be provided in the groove walls 9*b* in both sides.

Fifth Embodiment

Since a fifth embodiment has the same structure as that of the fourth embodiment except the following structures of the groove portion and protruding stripe, a description will be given mainly of different points by omitting the common points. In this case, the same reference numerals are attached to the same members as the already described members in the description of the fourth embodiment, and an overlapping description will be omitted.

The communication rubber portion 45 shown in FIG. 11 has the same structure as the fourth embodiment mentioned above, except for a provision of a stripe protruding portion 45*a* extending toward a leading end side of the protruding stripe 40 in a side surface of the protruding stripe 40. The communication rubber portion 45 is formed by the groove portion forming frame 15 as shown in FIG. 12, and the communication hole 18 provided in the groove portion forming frame 15 has a stripe groove portion 18*a* facing to the side wall of the protruding stripe forming portion 16 and extending toward the leading end side of the protruding stripe forming portion 16. At a time of forming the tread pattern, the unvulcanized rubber supplied via the communication hole 18 is smoothly filled in the leading end side of the protruding stripe forming portion 16 through the stripe groove portion 18*a*, and the shape of the top head portion 41 is more suitably formed.

It is preferable that the stripe protruding portion 45*a* is structured such that a protruding height is gradually decreased in the leading end side of the protruding stripe 40, and it is preferable that the stripe groove portion 18*a* is structured in the same manner such that a depth is gradually decreased in the leading end side of the protruding stripe forming portion 16, whereby an appearance of the protruding stripe 40 becomes good. In the illustrated example, since the stripe protruding portion 45*a* reaches the ridge line portion 41*a* of the tire outer circumferential side of the top head portion 41, the shape of the top head portion 41 is better formed. However, for example, the stripe protruding portion 45*a* may be terminated at a center portion in a height direction of the top head portion 41, and an improving effect corresponding thereto can be obtained.

Other Embodiments (1) In the embodiment mentioned above, there is shown the example in which the tread pattern is constituted by the rib pattern, however, the present invention is not limited to this, but the tread pattern may be constituted by a pattern including a block serving as the land portion in a partial portion or a whole portion, and the groove portion provided with the protruding stripe may be constituted by a lateral groove, an inclined groove or the like. In this case, since the stone biting is significantly generated in the circumferential groove, it is preferable that the protruding stripe is provided in the groove bottom of at least one circumferential groove.

(2) In the embodiment mentioned above, there is shown the example in which the protruding stripe is provided only in the circumferential groove positioned in the outermost side in the tire width direction, however, the present invention is not limited to this, but the structure may be made, for example, such that the protruding stripe is provided only in the groove portion positioned in the center side in the tire width direction, or the protruding stripe is provided in all the groove portions on the tread surface.

(3) In the fourth embodiment mentioned above, there is shown the example in which the tabular communication rubber portion is provided in such a manner as to be integrally connected to the lower side portion of the top head portion, the side surface of the base portion, the groove wall and the groove bottom, however, the present invention is not limited to this, but may be structured, for example, as shown in FIG. 13. In this case, in an example shown in FIGS. 13 and 14, the same reference numerals are given to the same members as the members described in the fourth embodiment.

The protruding stripe 40 shown in FIG. 13 is provided with the top head portion 41 and the base portion 42, and is provided with a columnar communication rubber portion 46 extending from the groove wall 9b toward the side surface of the top head portion 41. Since the communication rubber portion 46 is formed by the communication hole 19 of the groove portion forming frame 15 as shown in FIG. 14, and the unvulcanized rubber is directly supplied to the portion corresponding to the top head portion 41 of the protruding stripe forming portion 16, the shape of the top head portion 41 is better formed. The communication rubber portion 46 is cut at any position at a time of being released from the tire mold after finishing the vulcanization, and gets into a state of being provided at least one of the side surface of the top head portion 41 and the groove wall 9b.

(4) In the embodiment mentioned above, there is shown the example in which the protruding stripe continuously extends, however, the present invention is not limited to this, but the protruding stripe may intermittently extend such as a protruding stripe 60 shown in FIG. 15. Accordingly, it is possible to increase the drainage performance so as to improve the wet performance particularly at a time when the wear has advanced. In this case, since the small stone tends to be pinched in an intermittent portion 65 by intermittently forming the protruding stripe 60, it is preferable to appropriately select whether the protruding stripe is continuously provided or intermittently provided in the present invention, and the interval between the intermittent portions, while taking into consideration a balance between the stone biting resistance and the wet performance.

A protruding stripe 70 shown in FIG. 16 is structured such as to intermittently extend in the same manner as the protruding stripe 60, however, end portions of top head portions 71 opposing to each other are formed so as to swell in a semispherical shape in the intermittent portion 75. In accordance with the structure mentioned above, since the end portion of the top head portion 71 is deflected with respect to the small stone which is going to make an intrusion into the intermittent portion 75, whereby the reaction force is generated, and it is possible to effectively suppress the stone biting in the intermittent portion 75, it is possible to increase the stone biting resistance while improving the wet performance.

(5) The cross sectional shape of the protruding stripe may employ the other shapes than the shapes mentioned above, however, in the light of easily inclining the top head portion, it is preferable that the protruding stripe is locally pinched-in at the base portion such as the embodiments mentioned above. Further, the height of the protruding stripe may be changed periodically or at random.

EXAMPLES

A description will be given of an example specifically showing the structure and the effect of the present invention. In this case, evaluation items in the examples and the like are set as follows and a measurement is executed.

(1) Damage of Groove Bottom and Groove Bottom Crack

A test tire is installed to a steered wheel of a tractor head in which an axle layout is constituted by 2-D, and is made travel 100 thousand km on a dry road surface, thereafter a status of generation of a damage of a groove bottom (except a crack) and a groove bottom crack is checked by a visual observation, and the number of those spots of damages and cracks is counted. An inverse number of the counted number is evaluated on the basis of an index number by setting a comparative example 1 to 100. A greater numerical value indicates a better stone biting resistance.

(2) Number of Bitten Stones

The number of small stones pinched in the groove portion at a time of having traveled 10 thousand, 20 thousand and 30 thousand km, in the travel on the dry road surface, is counted and an average value is calculated.

(3) Wet Performance

The test tire in which the tread surface is scraped until the groove depth of the circumferential groove comes to 4 mm, is installed to the steered wheel of the tractor head in which the axle layout is constituted by 2-D, and a feeling evaluation is executed by making travel on the wet road surface. An index number is evaluated by setting the comparative example 1 to 100. A greater numerical value indicates a better wet performance.

Comparative Example 1

A pneumatic tire (size 295/75R22.5) having the structure shown in FIGS. 1 and 2 is prepared, and the evaluations mentioned above are executed. A rubber hardness (rubber hardness in durometer hardness test (type A) of JISK6253) of the tread rubber is set to 65 degree, a groove width in a tread surface of the circumferential groove is set to 13 mm, a groove depth D is set to 14 mm, and a groove bottom width W3 is set to 9 mm. Further, the protruding stripe is formed in an approximately rectangular cross sectional shape as shown in FIG. 17, a height is set to 4 mm, and a width is set to 3.5 mm.

Comparative Example 2

There is prepared a pneumatic tire having the same structure as the comparative example 1 except that the protruding stripe is formed in a shelf shape by being integrally connected to the groove wall in one side, and the evaluations mentioned above are executed.

Example 1

A pneumatic tire (size 295/75R22.5) having the structure shown in FIGS. 1 and 2 is prepared, and the evaluations mentioned above are executed. A rubber hardness of the tread rubber is set to 65 degree, a groove width in a tread surface of the circumferential groove is set to 13 mm, a groove depth D is set to 14 mm, and a groove bottom width W3 is set to 9 mm. Further, the protruding stripe is formed in a shape provided with the top head portion and the base portion as shown in FIG. 3, the maximum width W1 of the top head portion is set to 3.5 mm, the minimum width W2 of the base portion is set to 1.7 mm (W2/W1=0.5), and the height h of the minimum width position of the base portion is set to 1.2 mm. This is a shape obtained by scraping the side surface of the protruding stripe of the comparative example 1 in a semicircular arc shape by 0.9 mm for each side.

Example 2

There is prepared a tire having the same structure as the example 1 except that the maximum width W1 of the top head portion is set to 3.5 mm, the minimum width W2 of the base portion is set to 3.1 mm (W2/W1=0.9), the height h of the minimum width position of the base portion is set to 1.5 mm, and the side surface of the protruding stripe of the comparative example 1 is scraped in a semicircular arc shape by 0.2 mm for each side, and the evaluations mentioned above are executed.

Example 3

There is prepared a tire having the same structure as the example 1 except that the maximum width W1 of the top head portion is set to 3.5 mm, the minimum width W2 of the base portion is set to 2.5 mm (W2/W1=0.7), the height h of the minimum width position of the base portion is set to 1.7 mm, and the side surface of the protruding stripe of the comparative example 1 is scraped in a semicircular arc shape by 0.5 mm for each side, and the evaluations mentioned above are executed.

Example 4

There is prepared a time having the same structure as the example 1 except that the protruding stripe is intermittently extended as shown in FIG. 15, and the evaluations mentioned above are executed. In this case, a length in the circumferential direction of the separated protruding stripe is set to 8 mm, and an interval of the intermittent portion is set to 3 mm. Results of evaluations in each of the examples are shown in table 1.

TABLE 1

| | Comparative Example 1 | Comparative Example 2 | Example 1 | Example 2 | Example 3 | Example 4 |
|---|---|---|---|---|---|---|
| Damage of groove bottom | 100 | 89 | 115 | 105 | 109 | 114 |
| Groove bottom crack | 100 | 108 | 120 | 110 | 117 | 118 |
| Number of bitten stones | 15 | 18 | 3 | 9 | 5 | 5 |
| Wet performance | 100 | 100 | 112 | 110 | 110 | 115 |

From table 1, in the examples 1 to 4, the damage of the groove bottom and the groove bottom crack are generated less than the comparative examples 1 and 2, and the number of the small stones pinched in the groove portion is small. Accordingly, it is known that the stone biting resistance is improved by setting the protruding stripe as mentioned above. In the comparative example 2, since the groove bottom is open comparatively widely, it seems that the small stone easily reaches the groove bottom, thereby causing the damage of the groove bottom. Further, in the examples 1 to 4, the volumetric capacity of the groove bottom side is larger in comparison with the comparative examples 1 and 2, whereby the excellent wet performance is achieved, and, as can be understood, it is possible to achieve both the stone biting resistance and the wet performance.

What is claimed is:

1. A pneumatic tire in which a tread surface is provided with a groove portion, and a land portion divided by the groove portion,
    wherein a protruding stripe extending along an extending direction of the groove portion is provided in a groove bottom of the groove portion,
    wherein the protruding stripe is provided with a top head portion protruding toward a tire outer circumferential side, and a base portion being narrower than the top head portion and connecting the top head portion and the groove bottom, and
    wherein a ratio H/D of a height H of the protruding stripe with respect to a groove depth D of the groove portion satisfies the relation $0.2<H/D<0.5$; the height of the protruding stripe is constant; the base portion is pinched-in while having a side surface formed in a circular arc cross sectional shape, and the side surface is smoothly connected to a side surface of the top head portion and the groove bottom; a ridge line portion in the tire outer circumferential side of the top head portion is formed by a curved surface having a circular arc cross sectional shape; the top head portion is formed in a vertically longer rectangular cross sectional shape and a top surface of the top head portion is formed by a plane surface.

2. A pneumatic tire according to claim 1, wherein a ratio of a minimum width of the base portion with respect to a maximum width of the top head portion is between 0.5 and 0.9.

3. A pneumatic tire according to claim 1, wherein a communication rubber portion formed by a communication hole communicating a protruding stripe forming portion and a groove wall forming portion in a groove portion forming frame provided in a tire mold is provided in at least one of the side surface of the protruding stripe and the groove wall of the groove portion.

4. A pneumatic tire according to claim 3, wherein the communication rubber portion has a stripe protruding portion which is formed by the communication hole and extends toward a leading end side of the protruding stripe in the side surface of the protruding stripe.

5. A pneumatic tire according to claim 1, wherein the protruding stripe is provided in a groove bottom of a circumferential groove continuously formed along the tire circumferential direction, and the land portion has a rib divided by the circumferential groove, and
    wherein an angle formed by the intersection of imaginary planes, each of the planes extending in a tire radial direction from opposing groove walls of the circumferential groove, is equal to or less than 10 degrees, and one-side open sipes extending to a tire inner circumferential side more than the top head portion from a surface of the rib are provided in an edge portion of the rib so as to be spaced at 3 to 6 mm.

6. A tire mold for making the pneumatic tire according to claim 1 in which a groove portion forming frame for forming a groove portion of a tread surface is provided in a protruding manner in a forming surface portion for forming a tread pattern of a pneumatic tire, wherein the groove portion forming frame is provided with a groove bottom forming portion for forming a groove bottom of the groove portion, a groove wall forming portion for forming a groove wall of the groove portion, and a protruding stripe forming portion provided in a concave manner in the groove bottom forming portion and for forming a protruding stripe extending along an extending direction of the groove portion in the groove bottom, wherein the protruding stripe forming portion has a first forming portion for forming a top head portion of the protruding stripe, and a second forming portion having two spaced apart end portions provided in a leading end side of the groove portion forming frame so as to be narrower than the first forming portion, and for forming a base portion of the protruding stripe, and wherein a ratio H/D of a height H of the protruding stripe forming portion with respect to a groove depth D of the groove wall forming portion satisfies the relation $0.2 < H/D < 0.5$; the height of the protruding stripe forming portion is constant; the two end portions have a side surface formed in a circular arc cross sectional shape for forming the base portion such that the base portion is pinched-in, and the side surface of the two end portions is smoothly connected to a side surface of the first forming portion and the groove bottom forming portion, the first forming portion has a curved surface having a circular arc cross sectional shape for forming a ridge line portion in the tire outer circumferential side of the top head portion, a vertically longer rectangular cross-sectional shape and a plane surface for forming the top surface of the top head portion.

7. A tire mold according to claim 6, wherein the groove portion forming frame is provided with a communication hole communicating the protruding stripe forming portion and the groove wall forming portion.

8. A tire mold according to claim 7, wherein the communication hole has a stripe groove portion facing to a side wall of the protruding stripe forming portion and extending toward a leading end side of the protruding stripe forming portion.

\* \* \* \* \*